United States Patent
Hamer et al.

(10) Patent No.: US 6,437,674 B1
(45) Date of Patent: Aug. 20, 2002

(54) IGNITION APPARATUS HAVING BUILT-IN NOISE SUPPRESSION

(75) Inventors: Colin Hamer, Noblesville; Albert Anthony Skinner, Anderson, both of IN (US); Klaus Gernert, Konz (DE)

(73) Assignee: Delphi Technologies, Inc., Troy, MI (US)

( * ) Notice: Subject to any disclaimer, the term of this patent is extended or adjusted under 35 U.S.C. 154(b) by 4 days.

(21) Appl. No.: 09/774,928

(22) Filed: Jan. 31, 2001

(51) Int. Cl.⁷ .............................................. H01F 27/02
(52) U.S. Cl. .............................. 336/96; 336/92; 336/90; 29/602.1
(58) Field of Search ............................ 336/192, 90, 92, 336/96, 182; 123/634, 635; 29/602.1, 606

(56) References Cited

U.S. PATENT DOCUMENTS

| | | | |
|---|---|---|---|
| 4,611,570 A | * 9/1986 | Nash | 123/601 |
| 5,603,307 A | 2/1997 | Morita et al. | 123/633 |
| 6,292,082 B1 | * 9/2001 | Vogel et al. | 336/96 |

* cited by examiner

Primary Examiner—Anh Mai
(74) Attorney, Agent, or Firm—Margaret A. Dobrowitsky

(57) ABSTRACT

An ignition apparatus includes a suppression device comprising a suppression winding that is in series with the secondary winding and is further located outside of a magnetic circuit. The suppression winding is made from the same wire as used in the secondary winding and is wound on a reduced diameter portion of a secondary winding spool. A carbon resistor is disposed in series with the suppression winding in another embodiment. Nickel wire may be substituted for the suppression winding and carbon resistor in order to obtain both inductance and resistance characteristics for the suppression device.

20 Claims, 3 Drawing Sheets

IGNITION APPARATUS HAVING BUILT-IN NOISE SUPPRESSION

BACKGROUND OF THE INVENTION

1. Technical Field

The present invention relates generally to ignition coils for developing a spark firing voltage that is applied to one or more spark plugs of an internal combustion engine.

2. Discussion of the Background Art

Ignition coils are known for use in connection with an internal combustion engine such as an automobile engine, and which include a primary winding, a secondary winding, and a magnetic circuit. The magnetic circuit conventionally may comprise a cylindrical-shaped, central core extending along an axis, located radially inwardly of the primary and secondary windings and magnetically coupled thereto. One end of the secondary winding is conventionally configured to produce a relatively high voltage when a primary current through the primary winding is interrupted. The high voltage end is coupled to a spark plug, as known, that is arranged to generate a discharge spark responsive to the high voltage. The spark plug, however, operates as a noise generating source when such spark events occur, which may result in radio frequency interference (RFI). Separate mount ignition coils are generally connected to the spark plug through a spark plug cable, which has a minimizing effect on the RFI, due to its inherent inductance characteristics. Some types of ignition coils do not use ignition cables. For example, a relatively slender ignition coil configuration is known that is adapted for mounting directly above a spark plug--commonly referred to as a "pencil" coil. Such ignition coils, therefore, do not utilize ignition cables. Accordingly, the problem of RF noise presents particular challenges in the design of "pencil" (i.e., direct mount) coils.

One approach taken in the art is disclosed in U.S. Pat. No. 5,603,307 issued to Morita et al. Morita et al. disclose a buffer coil having an inductance that is much smaller than that of either the primary winding or the secondary winding connected in series with one of them. Morita et al., however, does not appear to disclose that the buffer coil is outside of the magnetic circuit described above, and is therefore not believed to be as effective in suppressing RF noise as may be possible.

Another approach taken in the art involves connecting a wire wound resistor in series with the secondary winding at the high voltage end of the secondary winding. Incorporating the resistor into the ignition coil adds complexity and introduces mechanical stress inasmuch as the substrate on which such wire wound resistors are available have a different coefficient of thermal expansion that conventional encapsulants (e.g., epoxy potting material) used in potting ignition coils. This mismatch causes the stresses during operation (thermal cycling) of the ignition coil, which in turn may lead to failure (i.e., failure of the encapsulant material, which leads to imperfect insulation).

Accordingly, there is a need for an improved ignition apparatus that minimizes or eliminates one or more of the problems as set forth above.

SUMMARY OF THE INVENTION

An object of the present invention is to solve one or more of the problems as set forth above. An ignition apparatus according to the present invention overcomes shortcomings of the conventional ignition apparatus by including a suppression device disposed outside of a magnetic circuit and comprising a suppression winding wound on the spool connected in series with the secondary winding. The foregoing approach eliminates thermal stresses associated with the conventional ignition coils that include a wire wound resistor. In addition, the present invention is less costly to implement compared to the use of the wire wound resistor. Being outside of the magnetic circuit allows the suppression device to present an inductance that is electrically distinct from the inductance associated with the secondary winding-this improves the suppression device's ability to reduce RF noise.

An ignition apparatus according to the present invention comprises a magnetically permeable central core having a main axis, primary and secondary windings outwardly of the core. The secondary winding is wound on a secondary winding spool formed of magnetically non-permeable material. The core and the windings being included in a magnetic circuit. The apparatus further includes a suppression device disposed outside of the magnetic circuit comprising a suppression winding also wound on the spool and that is connected in series with the secondary winding.

A method of making an ignition apparatus is also presented.

BRIEF DESCRIPTION OF THE DRAWINGS

The present invention will now be described by way of example, with reference to the accompanying drawings, in which.

DETAILED DESCRIPTION OF THE PREFERRED EMBODIMENTS

Figure 1:
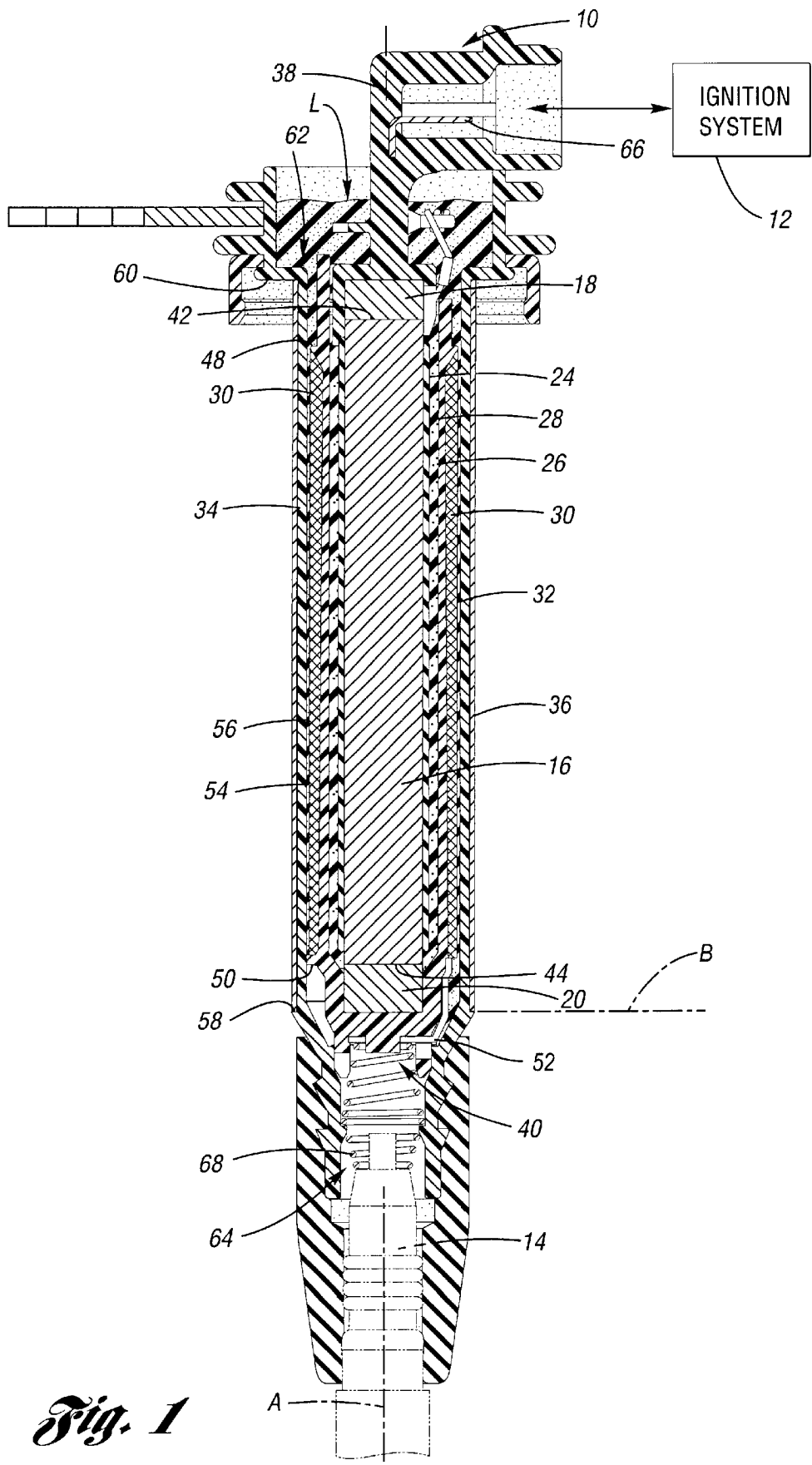
FIG. 1 is a simplified cross-sectional view of an ignition apparatus according to the present invention.

Referring now to the drawings wherein like reference numerals are used to identify identical components in the various views, FIG. 1 is a simplified, cross-section view of an ignition apparatus 10 in accordance with the present invention. As is generally known, ignition apparatus 10 may be coupled to, for example, an ignition system 12, which contains primary energization circuitry for controlling the charging and discharging of ignition apparatus 10. Further, also as is well known, the relatively high voltage produced by ignition apparatus 10 is provided to a spark plug 14 (shown in phantom-line format) for producing a spark across a spark gap thereof, which may be employed to initiate combustion in a combustion chamber of an engine. Ignition system 12 and spark plug 14 perform conventional functions well known to those of ordinary skill in the art.

Ignition apparatus 10 is adapted for installation to a conventional internal combustion engine through a spark plug well onto a high-voltage terminal of spark plug 14, which may be retained by a threaded engagement with a spark plug opening into the above-described combustion cylinder. The engine may provide power for locomotion of a vehicle, as known. Ignition apparatus 10 comprises a substantially slender high voltage transformer including substantially, coaxially arranged primary and secondary windings and a high permeability magnetic core.

FIG. 1 further shows a core 16, an optional first magnet 18, an optional second magnet 20, a primary winding 24, a first layer of encapsulant such as an epoxy potting material layer 26, a secondary winding spool 28, a secondary winding 30, a second epoxy potting material layer 32, a case 34, a shield 36, a low-voltage (LV) connector body 38, and a high-voltage (HV) connector assembly 40. It should be understood that in conventional operation spark plug 14, absent the improvement according to the present invention, constitutes a source of radio frequency noise or interference when producing sparks.

Figure 2:
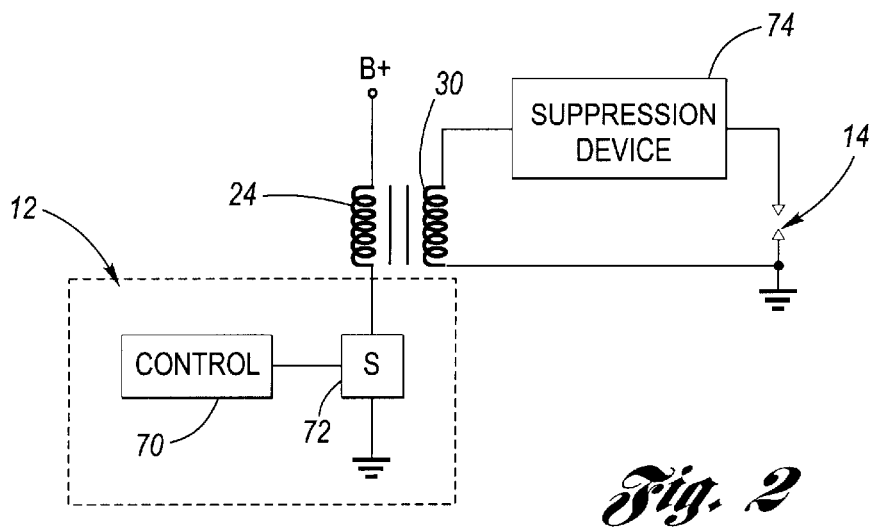
FIG. 2 is a simplified schematic diagram illustrating a suppression device used in the ignition apparatus of FIG. 1.

FIG. 2 is a schematic representation of an ignition apparatus 10 according to the present invention. Ignition system 12, shown in block diagram form in FIG. 1, includes a control unit 70 and a switch 72. FIG. 2 further shows a suppression device 74 electrically connected in-series with secondary winding 30. As further background, control unit 70 is configured generally to perform a plurality of functions, including generation of an ignition control signal EST (electronic spark timing). It should be understood that the ignition control signal EST may be generated or initiated by other control units not shown, such as a powertrain control module (PCM) in accordance with known ignition control strategies, and provided to control unit 70, such that control unit 70 responds by driving switch 72 to closure in response thereto. As known, the ignition control signal defines the initial charging time (e.g., duration), and the relative timing (e.g., relative to cylinder top dead center) of when a spark is to occur. Switch 72 is configured to selectively connect primary winding 24 to ground, responsive to the ignition control signal. Such a connection to ground, as is known generally in the art, will cause a primary current $I_p$ to flow through primary winding 24. Switch 72 is illustrated in the Figures as a block diagram; however, it should be understood that switch 72 may comprise conventional components known to those of ordinary skill in the art, such as, for purposes of example only, an insulated gate bipolar transistor (IGBT). When the ignition control signal is discontinued, switch 72 is opened up thereby interrupting the primary current. A voltage rise occurs across the secondary winding, a high voltage end of which is coupled to spark plug 14. The spaced electrodes of plug 14 (defining a gap therebetween) are shown in diagrammatic form in FIG. 2. The induced voltage continues to rise across this gap until breakdown occurs, resulting in an electrical discharge across the gap (i.e., the spark). As mentioned before, ordinarily this discharge may lead to generation of radio frequency (RF) noise or interference. According to the invention, however, suppression device 74 is configured to suppress such RF noise.

FIGS. 3–6 illustrate various embodiments of suppression device 74, respectively designated suppression devices 74*a*, 74*b*, 74*c* and 74*d*. Each will be described in turn, with coordinated reference to FIG. 7.

Figure 3:
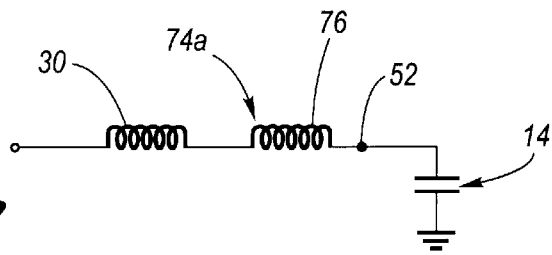
FIG. 3 is a simplified schematic diagram of a first embodiment of the suppression device of FIG. 2.

FIG. 3 shows suppression device 74a that includes a suppression winding 76 connected in series with secondary winding 30. Suppression winding 76 may comprise the same wire material used for the main turns of secondary winding 30 and may also be continuous therewith (i.e., no breaks).

Figure 7:
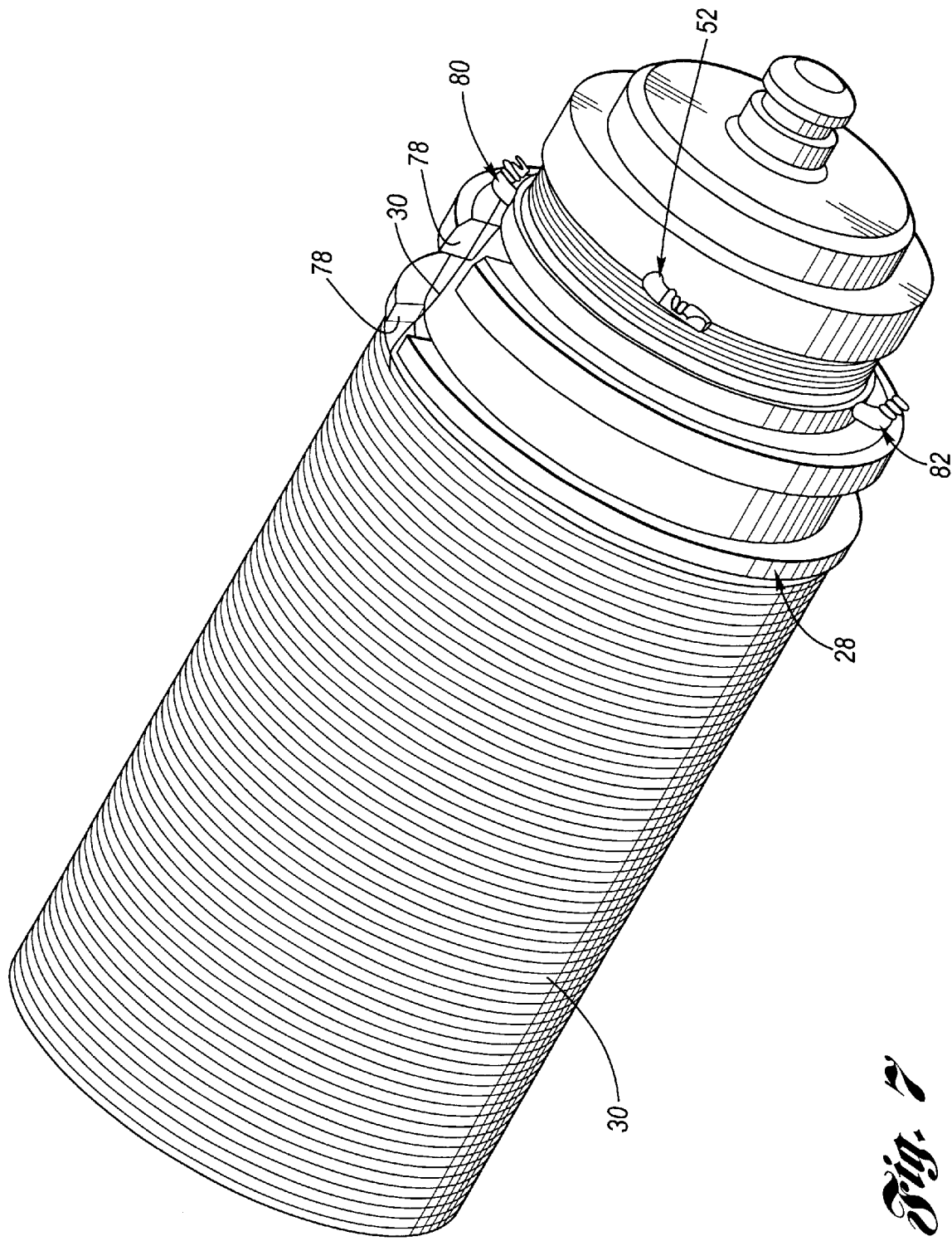
FIG. 7 is a perspective view of a secondary winding spool having the suppression device according to the invention.

With particular reference to FIG. 7, there is shown a perspective view of secondary winding spool 28 carrying a plurality of turns of wire on a main body portion thereof defining secondary winding 30. In the illustrated embodiment, spool 28 may be formed with a channel 78 configured to allow axial routing of the wire that forms secondary winding 30. FIG. 7 also shows a first terminal 80 and a second terminal 82, in addition to a high-voltage terminal 52 that connects to high-voltage connector assembly 40 (best shown in FIG. 1). In the first embodiment, the main turns of secondary winding 30 are made, then, in a continuous fashion (e.g., on the same winder), further turns are made to form suppression winding 76. The end of the suppression winding 76 is then connected to high-voltage terminal 52. In the illustrative embodiment, the diameter of the turns of suppression winding 76 is reduced relative to the diameter of the turns of secondary winding 30. However, the respective circular patterns of the secondary winding 30 and suppression winding 76 are substantially coaxial, although axially offset or spaced apart, one from another. The value of the inductance sought for suppression winding 76 will vary depending on the overall design of the ignition apparatus and the desired suppression bandwidth ranges. For example purposes only, however, the secondary winding 30 may comprise between about 10,000–30,000 turns of 40–46 AWG polyester coated copper wire, and may more preferably be between about 15,000–25,000 turns, while the suppression winding 76 may comprise approximately 20 turns of the same wire at about a 16mm diameter (e.g., which yields about 15 to 20 $\mu$H).

In addition, suppression winding 76 (as well as winding 86 described below) is disposed outside of a magnetic circuit comprising core 16, windings 24 and 30, and shield 36. This is preferred since is presents the inductance provided by suppression winding 76 as distinct from the inductance provided by secondary winding 30, which improves the suppression effectiveness of suppression device 74. Referring to FIG. 1, the lowermost axial extent of any of the components in the magnetic circuit is illustrated by the line designated "B", which corresponds to a lowermost axial edge or bottom of shield 36. As further illustrated, shield 36, core 16 and magnets 18, 20 (if present) generally extend about the same axial length. While magnetic flux may exist in areas below the line designated "B", "outside" of the magnetic circuit herein means that the suppression winding is axially spaced from line "B", or, in other words, below the lowermost portion of any one of the core, magnets (if present), primary and secondary windings, or shield.

Figure 4:
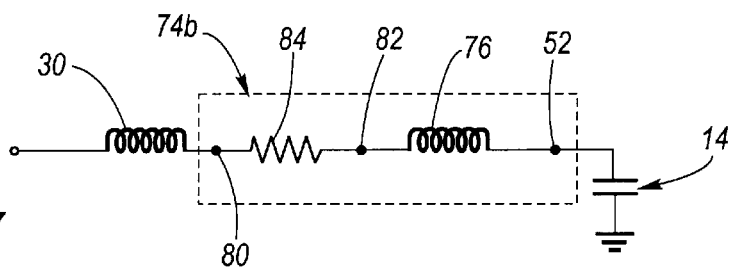
FIG. 4 is a simplified schematic diagram of a second embodiment of the suppression device of FIG. 2.
Figure 5:
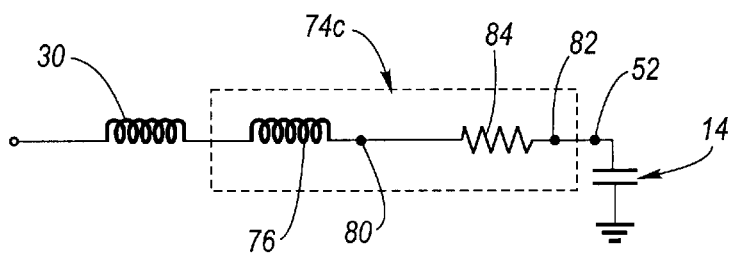
FIG. 5 is a simplified schematic diagram of a third embodiment of the suppression device of FIG. 2.

FIGS. 4 and 5 show suppression devices 74*b* and 74*c*, respectively, each including a suppression winding 76 connected in series with a resistor 84. The embodiments of FIGS. 4 and 5 may be used when a resistance is desirable or required in order to obtain a predetermined suppression effect (i.e., to obtain a certain level of suppression over a certain bandwidth on or around a nominal center frequency). Resistor 84 may comprise a carbon resistor, which is much less expensive than wire wound resistor referred to in the Background (e.g., $0.01 versus $0.12–$0.20). Again, suppression winding 76 may comprise the same wire material used for the main turns of secondary winding 30.

Referring to FIGS. 4 and 7, and regarding suppression device 74*b*, when resistor 84 is placed intermediate the secondary winding 30 and suppression winding 76, it provides a measure of isolation therebetween. In this embodiment, secondary winding 30 is wound and the high voltage end thereof is routed through channel 78 and is terminated on metal terminal 80. The ends of resistor 84 are respectively coupled to metal terminals 80 and 82. Resistor 84 may be disposed on the exterior of spool 28 or may alternatively be molded into it. Suppression winding 76 may be wound as described above on the reduced diameter portion of spool 28. One end of suppression winding 76 is connected to metal terminal 82 while the other end is connected to high-voltage terminal 52. Regarding suppression device 74c, suppression winding 76 is wound, preferably, in a continuous fashion on the reduced diameter portion of spool 28, and is terminated on terminal 80. Resistor 84 is coupled between terminals 80, 82 as described above. Finally, a connector is made between terminals 82 and 52.

Figure 6:
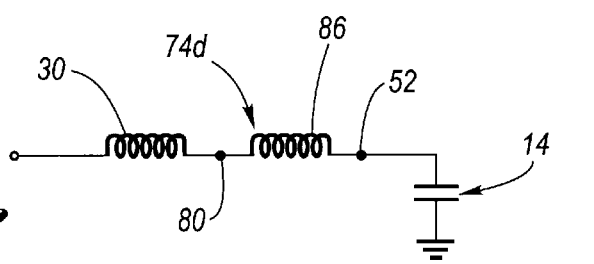
FIG. 6 is a simplified schematic diagram of a fourth embodiment of the suppression device of FIG. 2.

FIG. 6 shows a fourth embodiment of the present invention, namely suppression device 74d. Suppression device 74d includes a suppression winding 86 connected in series with secondary winding 30. Suppression winding 86 comprises a wire conductor that includes a relatively high resistance, such as nickel wire, various types of which are known in the art. Suppression winding 86 may be wound as described above on the reduced diameter portion of spool 28. The winding 86 may be uncoated and the turns spaced, or, preferably, the winding 86 may be of the coated type (i.e., insulated type) having a coating similar to that used on the secondary winding 30. Suppression winding 86 may be wound first with its ends connected to terminals 80 and 52. Next, the secondary winding 30 may be wound, with the high voltage end thereof being routed through channel 78 and connected to terminal 80.

The foregoing embodiments of suppression device are operative to reduce RF interference. One bandwidth of interest (medium wave) may be centered about 22 kHz, while a second bandwidth of interest may be centered about 100 MHz. Of course, the suppression device may be configured to suppress other bandwidths of interest, for example, in the gigahertz range (e.g., of concern to cell phones). It should be appreciated that the inductance of the suppression winding is established in part as a function of the diameter of the spool 28 in the reduced diameter area.

Referring again to FIG. 1, further details concerning an exemplary ignition apparatus 10 will now be set forth configured to enable one to practice the present invention. It should be understood that the following is exemplary only and not limiting in nature. Many other configurations are known to those of ordinary skill in the art and are consistent with the teachings of the present invention. Core 16 may be elongated, having a main, longitudinal axis "A" associated therewith. Core 16 includes an upper, first end 42, and a lower, second end 44. Core 16 may be a conventional core known to those of ordinary skill in the art. As illustrated, core 16, in the preferred embodiment, takes a generally cylindrical shape (which is a generally circular shape in radial cross-section), and may comprise compression molded insulated iron particles.

Magnets 18 and 20 are included in ignition apparatus 10 as part of the magnetic circuit, and provide a magnetic bias for improved performance. The construction of magnets such as magnets 18 and 20, as well as their use and effect on performance, is well understood by those of ordinary skill in the art. It should be understood that magnets 18 and 20 are optional in ignition apparatus 10, and may be omitted, albeit with a reduced level of performance, which may be acceptable, depending on performance requirements.

Primary winding 24 may be wound directly onto core 16 in a manner known in the art. Primary winding 24 includes first and second ends and is configured to carry a primary current Ip for charging apparatus 10 upon control of ignition system 12. Winding 24 may be implemented using known approaches and conventional materials. Although not shown, primary winding 24 may be wound on a primary winding spool (not shown).

Layers 26 and 32 comprise an encapsulant suitable for providing electrical insulation within ignition apparatus 10. In a preferred embodiment, the encapsulant comprises epoxy potting material. The epoxy potting material introduced in layers 26, and 32 may be introduced into annular potting channels defined (i) between primary winding 24 and secondary winding spool 28, and, (ii) between secondary winding 30 and case 34. The potting channels are filled with potting material, in the illustrated embodiment, up to approximately the level designated "L" in FIG. 1. In one embodiment, layer 26 may be between about 0.1 mm and 1.0 mm thick. Of course, a variety of other thicknesses are possible depending on flow characteristics and insulating characteristics of the encapsulant. The potting material also provides protection from environmental factors which may be encountered during the service life of ignition apparatus 10. There is a number of suitable epoxy potting materials well known to those of ordinary skill in the art.

Secondary winding spool 28 is configured to receive and retain secondary winding 30. In addition to the features described above in connection with FIG. 7, spool 28 is also characterized by the following. Spool 28 is disposed adjacent to and radially outwardly of the central components comprising core 16, primary winding 24, and epoxy potting layer 26, and, preferably, is in coaxial relationship therewith. Spool 28 may comprise any one of a number of conventional spool configurations known to those of ordinary skill in the art. In the illustrated embodiment, spool 28 is configured to receive one continuous secondary winding (e.g., progressive winding), as is known. However, it should be understood that other configurations may be employed, such as, for example only, a configuration adapted for use with a segmented winding strategy (e.g., a spool of the type having a plurality of axially spaced ribs forming a plurality of channels therebetween for accepting windings) as known.

The depth of the secondary winding in the illustrated embodiment may decrease from the top of spool 28 (i.e., near the upper end 42 of core 16), to the other end of spool 28 (i.e., near the lower end 44) by way of a progressive gradual flare of the spool body. The result of the flare or taper is to increase the radial distance (i.e., taken with respect to axis "A") between primary winding 24 and secondary winding 30, progressively, from the top to the bottom. As is known in the art, the voltage gradient in the axial direction, which increases toward the spark plug end (i.e., high voltage end) of the secondary winding, may require increased dielectric insulation between the secondary and primary windings, and, may be provided for by way of the progressively increased separation between the secondary and primary windings.

Spool 28 is formed generally of electrical insulating material having properties suitable for use in a relatively high temperature environment. For example, spool 28 may comprise plastic material such as PPO/PS (e.g., NORYL available from General Electric) or polybutylene terephthalate (PBT) thermoplastic polyester. It should be understood that there are a variety of alternative materials that may be used for spool 28 known to those of ordinary skill in the ignition art, the foregoing being exemplary only and not limiting in nature.

Spool 28 may further include a first annular feature 48 and a second annular feature 50 formed at axially opposite ends thereof. Features 48 and 50 may be configured so as to engage an inner surface of case 34 to locate, align, and center the spool 28 in the cavity of case 34.

In addition, the body portion of spool 28 tapers on a lower end thereof to a reduced diameter, generally cylindrical outer surface sized to provide an interference fit with respect to a corresponding through-aperture at the lower end of case 34. In addition, the spool body includes a blind bore or well at the spark plug end configured in size and shape to accommodate the size and shape of HV connector assembly 40. In connection with this function, spool 28 includes an electrically conductive (i.e., metal) high-voltage (HV) terminal 52 disposed therein configured to connect suppression device 74 to the HV connector assembly 40.

FIG. 1 also shows secondary winding 30 in cross-section. Secondary winding 30, as described above, is wound on spool 28, and includes a low voltage end and a high voltage end. The low voltage end may be connected to ground by way of a ground connection through LV connector body 38 in a manner known to those of ordinary skill in the art. The high voltage end is connected to suppression device 74 is a manner described above. Winding 30 may be implemented using conventional approaches and material known to those of ordinary skill in the art.

Case 34 includes an inner, generally cylindrical surface 54, an outer surface 56, a first annular shoulder 58, a flange 60, an upper through-bore 62, and a lower through bore 64.

Inner surface 54 is configured in size to receive and retain the core 16/primary winding 24/spool 28/secondary winding 30 assembly. The inner surface 54 of case 34 may be slightly spaced from spool 28, particularly the annular spacing features 48, 50 thereof (as shown), or may engage the spacing features 48, 50.

Annular shoulder 58 and flange 60 are located near the lower, and upper ends of case 34, respectively. Shoulder 58 is formed in size and shape to engage and support a bottommost circumferential edge of shield 36. Likewise, flange 60 is configured in size and shape to engage and support an uppermost circumferential edge of shield 36.

Bore 62 is configured in size and shape to receive the combined assembly of core 16/primary winding 24/spool 28/secondary winding 30.

Bore 64 is defined by an inner surface thereof configured in size and shape (i.e., generally cylindrical) to provide an interference fit with an outer surface of spool body 28 (i.e., a lowermost portion thereof), as described above. When the lowermost body portion of spool 28 is inserted in bore 64, therefore, a seal is made.

Case 34 is formed of electrical insulating material, and may comprise conventional materials known to those of ordinary skill in the art (e.g., the PBT thermoplastic polyester material referred to above).

Shield 36 is generally annular in shape and is disposed radially outwardly of case 34, and, preferably, engages outer surface 56 of case 34. The shield 36 is preferably comprises electrically conductive material, and, more preferably metal, such as silicon steel or other adequate magnetic material. Shield 36 provides not only a protective barrier for ignition apparatus 10 generally, but, further, provides a magnetic path for the magnetic circuit portion of ignition apparatus 10. Shield 36 may nominally be about 0.50 mm thick, in one embodiment. Shield 36 may be grounded by way of an internal grounding strap, finger or the like (not shown) well know to those of ordinary skill in the art. Shield 36 may comprise multiple, individual sheets 36.

Low voltage connector body 38 is configured to, among other things, electrically connect the first and second ends of primary winding 24 to an energization source, such as, the energization circuitry included in ignition system 12. Connector body 38 is generally formed of electrical insulating material, but also includes a plurality of electrically conductive output terminals 66 (e.g., pins for ground, primary winding leads, etc.). Terminals 66 are coupled electrically, internally through connector body 38, in a manner known to those of ordinary skill in the art, and are thereafter connected to various parts of apparatus 10, also in a manner generally know to those of ordinary skill in the art.

HV connector assembly 40 may include a spring contact 68 or the like, which is electrically coupled to HV terminal 52 disposed in a blind bore portion formed in a lowermost end of spool 28. Contact spring 68 is configured to engage a high-voltage connector terminal of spark plug 14. This arrangement for coupling the high voltage developed by secondary winding 30 to plug 14 is exemplary only; a number of alternative connector arrangements, particularly spring-biased arrangements, are known in the art.

An ignition apparatus in accordance with the present invention includes a suppression device connected in series with the secondary winding and is disposed outside of the magnetic circuit. In a preferred embodiment, the same wire that is used to wind the secondary winding is used to form the suppression winding but is wound on a reduced diameter portion of the secondary winding spool. In a further embodiment, a carbon resistor is further connected in series with the suppression winding. In a still further embodiment, nickel wire is used for the suppression winding in lieu of the standard wire and the carbon resistor. The invention suppresses RFI while reducing or eliminating complexities and part costs associated with conventional approaches taken in the art.

It is to be understood that the above description is merely exemplary rather than limiting in nature, the invention being limited only by the appended claims. Various modifications and changes may be made thereto by one of ordinary skill in the art, which embody the principles of the invention and fall within the spirit and scope thereof.

What is claimed is:

1. An ignition apparatus comprising:
   a magnetically-permeable central core having a main axis;
   primary and secondary windings outwardly of said core, said secondary winding being wound on a secondary winding spool of magnetically non-permeable material, said core and said windings being included in a magnetic circuit; and
   a suppression device disposed outside of said magnetic circuit comprising a suppression winding wound on said spool connected in series with said secondary winding.

2. The ignition apparatus of claim 1 wherein said core has first and second opposing ends with respect to said main axis, said suppression winding being axially spaced from one of said ends.

3. The ignition apparatus of claim 2 further comprising a magnetically-permeable shield having a cylindrical shape disposed radially outwardly of said central core and primary and secondary windings and included in said magnetic circuit, said suppression winding being axially spaced from an axial end of said shield.

4. The ignition apparatus of claim 1 wherein said suppression winding comprises a continuation of a conductor used for said secondary winding.

5. The ignition apparatus of claim 4 herein said secondary winding spool includes a terminal formed of electrically conductive material configured for connection to a high-voltage connector assembly for providing a spark plug a firing voltage, a terminating end of said suppression winding being connected to said terminal.

6. The ignition apparatus of claim 4 wherein said secondary winding spool includes a channel configured to allow passage of said conductor.

7. The ignition apparatus of claim 1 wherein said suppression winding is wound on said secondary winding spool.

8. The ignition apparatus of claim 7 wherein said secondary winding is wound on a portion of said secondary winding spool having a first diameter, said suppression winding is wound on a second portion of said spool having a second diameter less than said first diameter.

9. The ignition apparatus of claim 8 wherein an inductance of said suppression winding is determined as a function of said second diameter.

10. The ignition apparatus of claim 9 wherein said second diameter is selected as a function of a desired suppression bandwidth.

11. The ignition apparatus of claim 10 wherein said suppression bandwidth is at least one of a first bandwidth including a first frequency of about 22 kHz and a second bandwidth including a second frequency of about 100 MHz.

12. The ignition apparatus of claim 1 further including a resistor in series with said secondary winding and said suppression winding.

13. The ignition apparatus of claim 12 wherein said resistor comprises a carbon resistor.

14. The ignition apparatus of claim 12 wherein said secondary winding spool includes a first terminal, a second terminal and a third terminal each formed of metal, said resistor being coupled between said first and second terminals, said secondary winding being coupled to said first terminal, said suppression winding being coupled between said second and third terminals, and said third terminal being coupled to a high-voltage connector assembly configured for connection to a spark plug.

15. The ignition apparatus of claim 12 wherein said secondary winding spool includes a first terminal, a second terminal and a third terminal, each formed of metal, said suppression winding and said secondary winding being continuous and terminated on said first terminal, said resistor being coupled between said first and second terminals, said second terminal being coupled to said third terminal that is connected to a high-voltage connector assembly configured for connection to a spark plug.

16. The ignition apparatus of claim 1 wherein said secondary winding comprises copper wire having an electrically insulating coating, said s winding comprising nickel wire to thereby introduce an inductance and resistance component.

17. An ignition apparatus comprising:
   a central core of magnetically-permeable material having a main axis;
   a primary and a secondary winding radially outwardly of said central core, said secondary winding being wound on a secondary winding spool of non-magnetically-permeable material;
   a shield radially outwardly of said windings formed of magnetically-permeable material, said central core, said windings and said shield forming a magnetic circuit; and
   a suppression winding in series with said secondary winding disposed outside of said magnetic circuit.

18. The ignition apparatus of claim 17, wherein said suppression winding is axially spaced from respective axial ends of said core and said shield.

19. A method of making an ignition apparatus comprising the step of: winding a suppression coil on a secondary winding spool having a main axis that is axially spaced from a secondary winding such that the suppression coil is outside of a magnetic circuit.

20. The method of claim 19 further including the step of forming the spool such that a portion thereof bearing the suppression winding has a diameter selected to yield a preselected inductance for the suppression winding so as be operative to suppress one of a first bandwidth including 22 kHz and a second bandwidth including 100 MHz.

* * * * *